United States Patent
McNeal

(10) Patent No.: US 7,736,034 B1
(45) Date of Patent: Jun. 15, 2010

(54) AUXILIARY FENDER MOUNTED TURNING SIGNAL LIGHT SYSTEM

(76) Inventor: Tony McNeal, 1007 E. Louisiana Ave., Tampa, FL (US) 33803

( * ) Notice: Subject to any disclaimer, the term of this patent is extended or adjusted under 35 U.S.C. 154(b) by 0 days.

(21) Appl. No.: 12/220,416

(22) Filed: Jul. 24, 2008

Related U.S. Application Data

(60) Provisional application No. 60/966,633, filed on Aug. 30, 2007.

(51) Int. Cl.
*F21V 33/00* (2006.01)
(52) U.S. Cl. ...................... 362/506; 362/540
(58) Field of Classification Search ................ 362/505, 362/506, 543–545, 487, 496, 500, 607; 340/470–475
See application file for complete search history.

(56) References Cited

U.S. PATENT DOCUMENTS

| | | | | |
|---|---|---|---|---|
| 6,149,288 A * | 11/2000 | Huang | ........................ | 362/545 |
| 6,505,963 B1 * | 1/2003 | Chiang | ........................ | 362/545 |
| 6,619,824 B1 * | 9/2003 | Hou | ........................... | 362/501 |
| 6,685,349 B2 * | 2/2004 | Schmidt et al. | ............. | 362/506 |
| 6,910,788 B2 | 6/2005 | Jones | | |
| 6,945,679 B2 * | 9/2005 | Young | ........................ | 362/500 |
| 2004/0217855 A1 * | 11/2004 | Wang | ......................... | 340/468 |

* cited by examiner

*Primary Examiner*—Thomas M Sember

(57) ABSTRACT

A board is adapted to be secured to the exterior of a vehicle above each of its wheels. Each board has a plurality of fender lights. Electrical components include supplemental wiring. The supplemental wiring couples the boards and their fender lights to a battery, switch and conventional turning signal lights of a vehicle. In this manner when an operator energizes the conventional turning signal lights, the fender lights will flash with the corresponding conventional turning signal lights.

1 Claim, 3 Drawing Sheets

FIG 5
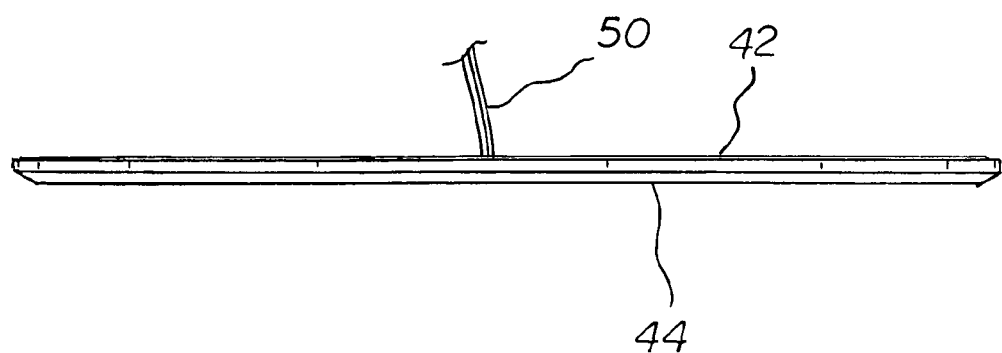
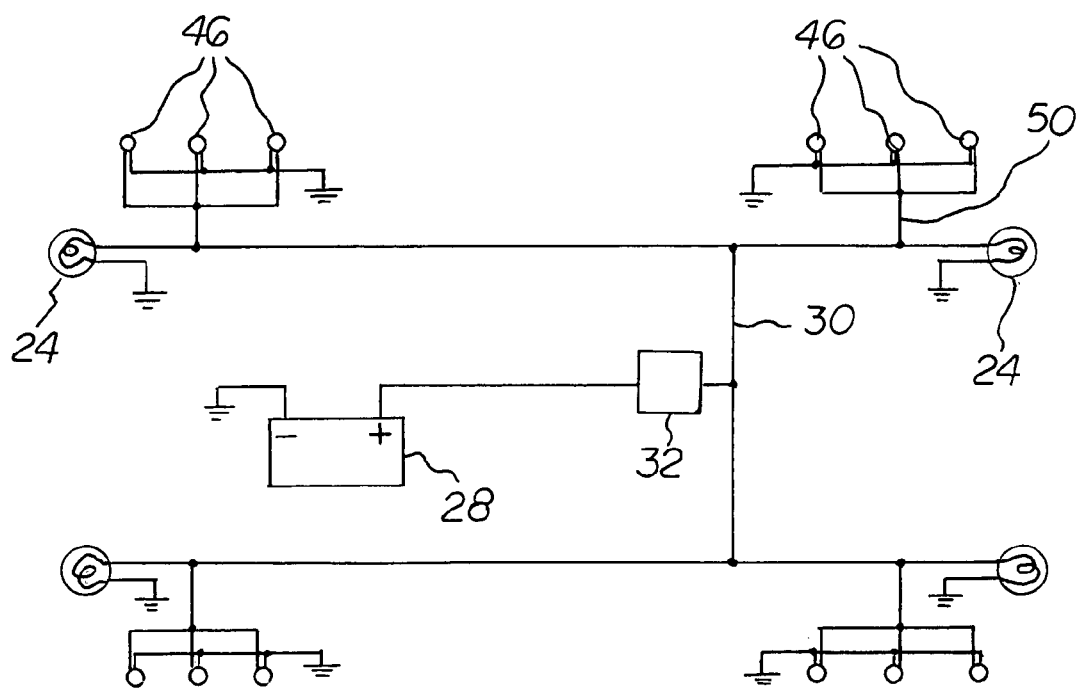
FIG 6

AUXILIARY FENDER MOUNTED TURNING SIGNAL LIGHT SYSTEM

RELATED APPLICATION

The present non-provisional application is based upon U.S. Provisional Application Ser. No. 60/966,633 file Aug. 30, 2007, the subject matter of which is incorporated herein by reference.

BACKGROUND OF THE INVENTION

1. Field of the Invention

The present invention relates to an auxiliary fender mounted turning signal light system and more particularly pertains to increasing road safety by rendering a vehicle, particularly its flashing turning signals, more visible to others, all in a safe, convenient and economical manner.

2. Description of the Prior Art

The use of turning signal light systems of known designs and configurations is known in the prior art. More specifically, turning signal light systems of known designs and configurations previously devised and utilized for the purpose of signaling through known methods and apparatuses are known to consist basically of familiar, expected and obvious structural configurations, notwithstanding the myriad of designs encompassed by the crowded prior art which has been developed for the fulfillment of countless objectives and requirements.

By way of example, U.S. Pat. No. 6,910,788 issued Jun. 28, 2005 relates to an LED Vehicle Wheel Well Illumination Device.

While this device fulfills its respective, particular objectives and requirements, the aforementioned patent does not describe a turning signal light system that allows signaling in a safe, accurate and efficient manner.

In this respect, the turning signal light systems according to the present invention substantially departs from the conventional concepts and designs of the prior art, and in doing so provides an apparatus primarily developed for the purpose of signaling in a safe, accurate and efficient manner.

Therefore, it can be appreciated that there exists a continuing need for a new and improved turning signal light systems which can be used for signaling in a safe, accurate and efficient manner. In this regard, the present invention substantially fulfills this need.

SUMMARY OF THE INVENTION

In view of the disadvantages inherent in the known types of light signals of known designs and configurations now present in the prior art, the present invention provides an improved auxiliary fender mounted turning signal light system. As such, the general purpose of the present invention, which will be described subsequently in greater detail, is to provide a new and improved auxiliary fender mounted turning signal light system and method which has all the advantages of the prior art and none of the disadvantages.

To attain this, the present invention essentially comprises an auxiliary fender mounted turning signal light system. First provided is a vehicle. The vehicle has a frame. The frame has a front end. The frame has a rear end. The frame has left and right sides. The sides couple the ends. The frame has wheels. Two wheels are provided on each side adjacent to the front and the rear. The frame has inverted U-shaped edges. The inverted U-shaped edges are provided adjacent to the wheels. Each of the edges has an essentially common length. Each of the edges has a generally center high point. Each of the edges has low end points.

Conventional lights are provided. The conventional lights are secured to the front and rear of the frame adjacent to the sides. The conventional lights flash. The flashing indicates to others the intention of a driver of the vehicle with regard to turning.

Provided next is an electrical assembly. The electrical assembly includes a battery. The electrical assembly includes wiring. The electrical assembly also includes a switch. The electrical assembly is supported by the frame. The switch is adapted to be pivoted downwardly by an operator of the vehicle. In this manner the conventional turning signal lights on the front and rear adjacent to the left side of the vehicle are energized. The switch is further adapted to be pivoted upwardly by an operator of the vehicle. In this manner the conventional lights on the front and rear adjacent to the right side of the vehicle are energized. The conventional lights are adapted to flash in response to being energized.

Further provided are housings with printed circuit boards. A housing is secured to the frame above each edge. Each housing has an inner chamber. The inner chamber receives a printed circuit board. Each housing has a flat interior face. The interior face is coupled to the frame. Each housing has a transparent exterior face. Each housing has a thickness of between 30 percent and 40 percent of its height. Each housing and printed circuit board are formed in an arcuate configuration. Each housing and printed circuit board extend for about 90 degrees of a circle. The high point of each housing and printed circuit board is provided adjacent to the high point of the edge with low points spaced above the end points of the edge. Each printed circuit board has a length of between 30 percent and 60 percent of the length of the edge. Each printed circuit board has a plurality of light emitting diodes.

Provided last are supplemental electrical components. The supplemental electrical components include supplemental wiring. The supplemental wiring couples the printed circuit boards and their light emitting diodes to the battery, switch and conventional lights. In this manner when the switch is pivoted downwardly by an operator of the vehicle to energize the conventional lights on the front and rear adjacent to the left side of the vehicle, the light emitting diodes on the left side of the vehicle will also be energized and flash. Further in this manner when the switch is pivoted upwardly by an operator of the vehicle to energize the conventional lights on the front and rear adjacent to the right side of the vehicle, the light emitting diodes on the right side of the vehicle will also be energized and flash. Even further, the light emitting diodes on both sides of the vehicle will flash with the conventional lights on the front and rear adjacent to both sides of the vehicle to function together as emergency flashing lights in response to activation of an emergency switch.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved auxiliary fender mounted turning signal light system which has all of the advantages of the prior art light signals of known designs and configurations and none of the disadvantages.

It is another object of the present invention to provide a new and improved auxiliary fender mounted turning signal light system which may be easily and efficiently manufactured and marketed.

It is further object of the present invention to provide a new and improved auxiliary fender mounted turning signal light system which is of durable and reliable constructions.

An even further object of the present invention is to provide a new and improved auxiliary fender mounted turning signal light system which is susceptible of a low cost of manufacture with regard to both materials and labor, and which accordingly is then susceptible of low prices of sale to the consuming public, thereby making such auxiliary fender mounted turning signal light system economically available to the buying public.

Even still another object of the present invention is to provide an auxiliary fender mounted turning signal light system for increasing road safety by rendering a vehicle, particularly its flashing turning signals, more visible to others, all in a safe, convenient and economical manner.

Lastly, it is an object of the present invention to provide a new and improved auxiliary fender mounted turning signal light system. A board is adapted to be secured to the exterior of a vehicle above each of its wheels. Each board has a plurality of fender lights. Electrical components include supplemental wiring. The supplemental wiring couples the boards and their fender lights to a battery, switch and conventional turning signal lights of a vehicle. In this manner when an operator energizes the conventional turning signal lights, the fender lights will flash with the corresponding conventional turning signal lights.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an enlarged plan view taken along line 5-5 of FIG. 3.

FIG. 6 is an electrical schematic illustration of the system of the prior Figures.

The same reference numerals refer to the same parts throughout the various Figures.

DESCRIPTION OF THE PREFERRED EMBODIMENT

Figure 1:
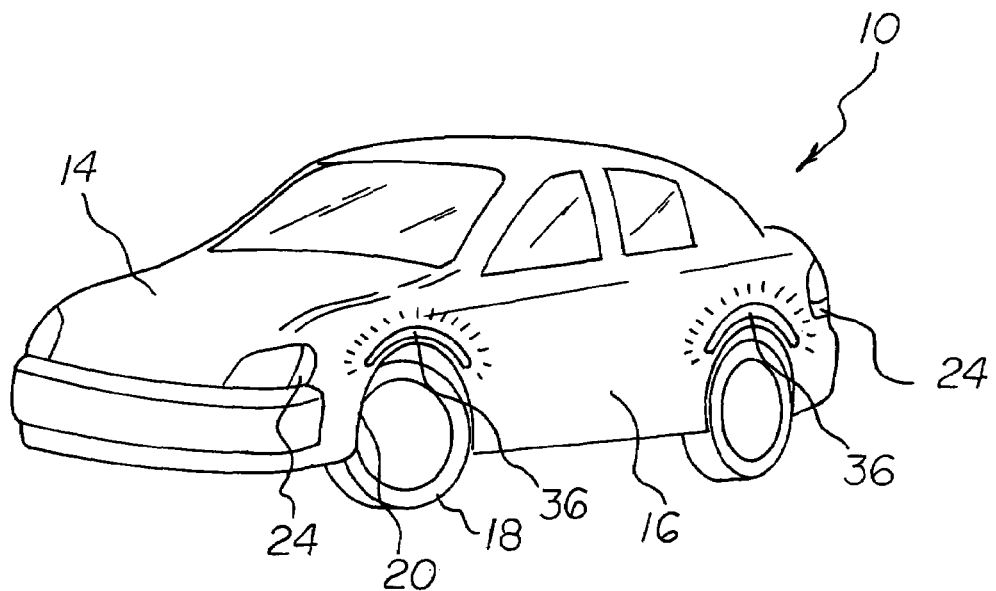
FIG. 1 is a perspective illustration of an auxiliary fender mounted turning signal light system constructed in accordance with the principles of the present invention.
Figure 2:
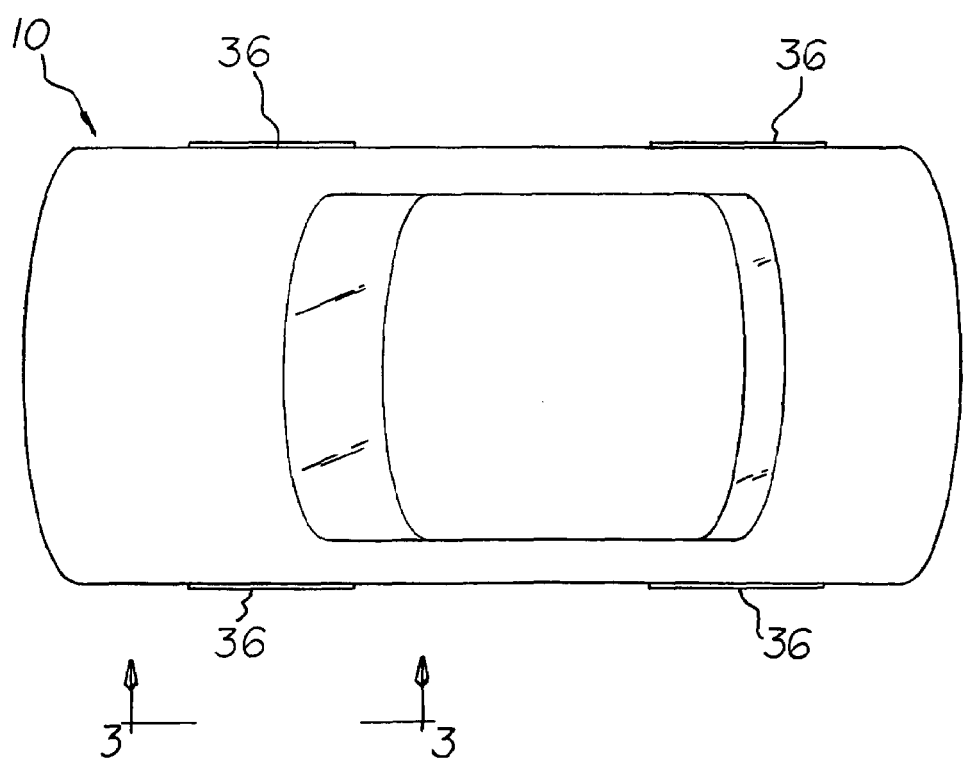
FIG. 2 is a plan view of the auxiliary fender mounted turning signal light system shown in FIG. 1.
Figure 3:
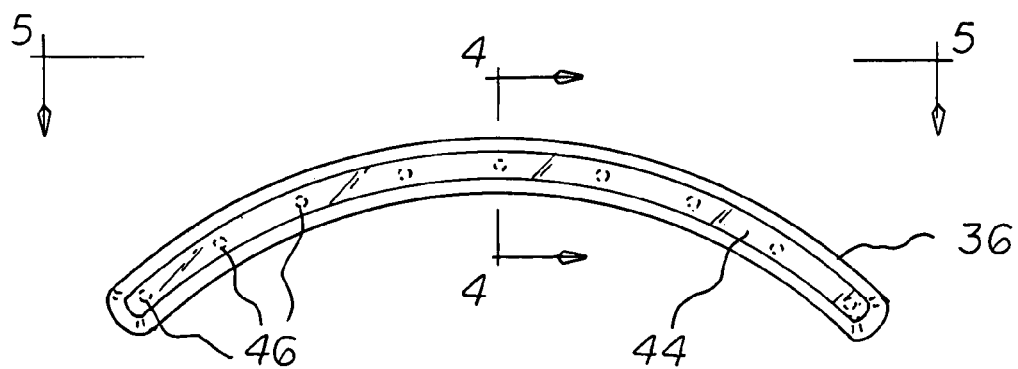
FIG. 3 is an enlarged side elevational view taken along line 3-3 of FIG. 2.
Figure 4:
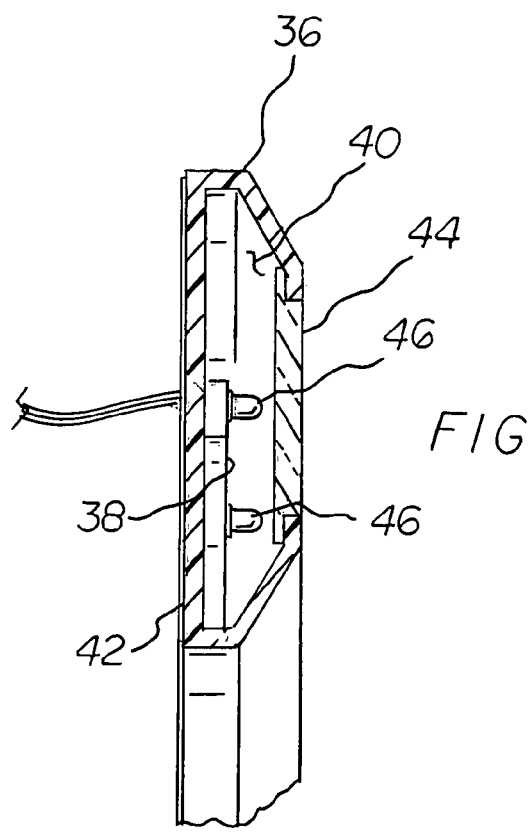
FIG. 4 is an enlarged cross sectional view taken along line 4-4 of FIG. 3.

With reference now to the drawings, and in particular to FIG. 1 thereof, the preferred embodiment of the new and improved auxiliary fender mounted turning signal light system embodying the principles and concepts of the present invention and generally designated by the reference numeral 10 will be described.

The present invention, the auxiliary fender mounted turning signal light system 10 is comprised of a plurality of components. Such components in their broadest context include a board and fender lights and electrical components. Such components are individually configured and correlated with respect to each other so as to attain the desired objectives.

First provided is a vehicle 14. The vehicle has a frame 16. The frame has a front end. The frame has a rear end and. The frame has left and right sides. The sides couple the ends. The frame has four wheels 18. Two wheels are provided on each side adjacent to the front and the rear. The frame has inverted U-shaped edges 20. The inverted U-shaped edges are provided adjacent to the wheels. Each of the edges has an essentially common length. Each of the edges has a generally center high point. Each of the edges has low end points.

Conventional turning signal lights 24 are provided. Such conventional lights are secured to the front and rear adjacent to each side of the frame. The conventional lights flash. The flashing indicates to others the intention of a driver of the vehicle with regard to turning.

Provided next is an electrical assembly. The electrical assembly includes a battery 28. The electrical assembly includes wiring 30. The electrical assembly also includes a switch 32. The electrical assembly is supported by the frame. The switch is adapted to be pivoted downwardly by an operator of the vehicle. In this manner the conventional lights on front and rear adjacent to the left side of the vehicle are energized. The switch is further adapted to be pivoted upwardly by an operator of the vehicle. In this manner the conventional lights on the front and rear adjacent to the right side of the vehicle are energized. The lights are adapted to flash in response to being energized.

Further provided are housings 36, each with a printed circuit board 38. A housing is secured to the exterior surface of the frame above each edge. Each housing has an inner chamber 40. Each inner chamber receives a printed circuit board. Each housing has a flat interior face 42. The interior face is coupled to the frame through a gasket. Each housing has a transparent exterior face 44. Each housing has a thickness of between 30 percent and 40 percent of its height. Each housing and printed circuit board are formed in an arcuate configuration. Each housing and printed circuit board extend for about 90 degrees of a circle. The high point of the housing and printed circuit board is provided adjacent to the high point of the edge with the low points spaced above the end points of the edge. Each printed circuit board has a length of between 30 percent and 60 percent of the length of the edge. Each printed circuit board has a plurality of light emitting diodes 46.

Provided last are supplemental electrical components. The supplemental electrical components includes supplemental wiring 50. The supplemental wiring couples the printed circuit boards and their light emitting diodes to the battery, switch and conventional lights. In this manner when the switch is pivoted downwardly by an operator of the vehicle to energize the conventional lights on the front and rear adjacent to the left side of the vehicle, the light emitting diodes on the left side of the vehicle will also be energized and flash. Further in this manner when the switch is pivoted upwardly by an operator of the vehicle to energize the conventional lights on front and rear adjacent to the right side of the vehicle, the light emitting diodes on the right side of the vehicle will also be energized and flash. Even further, the light emitting diodes on both sides of the vehicle will flash with the conventional lights on the front and rear adjacent to both sides of the vehicle to function together as emergency flashing lights in response to activation of an emergency switch.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An auxiliary fender mounted turning signal light system for increasing road safety by rendering a vehicle, particularly its flashing turning signals, more visible to others, the system comprising, in combination:

a vehicle having a frame with a front end and a rear end and with left and right sides coupling the ends, two wheels on each side adjacent to the front and the rear, a fender with an exterior surface and an inverted U-shaped lower edge in the frame adjacent to each wheel, each of the lower edges having an essentially common length with a generally center high point and with low end points;

a conventional light secured to the front and rear adjacent to each side of the frame for flashing to indicate to others the intention of a driver of the vehicle with regard to turning;

an electrical assembly including a battery with wiring and a switch supported by the frame, the switch adapted to be pivoted downwardly by an operator of the vehicle to energize the conventional lights on the front and rear adjacent to the left side of the vehicle, the switch adapted to be pivoted upwardly by an operator of the vehicle to energize the conventional lights on the front and rear adjacent to the right side of the vehicle, the conventional lights when energized adapted to flash in response to being energized;

a housing with a printed circuit board secured to the exterior surface of each fender spaced a distance above each edge to accommodate different fender shapes, each housing having an inner chamber receiving a printed circuit board, each housing having a flat interior face coupled to the exterior surface of the fender and a transparent central exterior face having a planar cross sectional configuration with a thickness of between 30 percent and 40 percent of its height, each housing and printed circuit board being in an arcuate configuration extending for about 90 degrees of a circle with a high point adjacent to the high point of the edge and low points spaced above the end points of the edge, each printed circuit board having a length of between 30 percent and 60 percent of the length of the edge, each printed circuit board having a plurality of light emitting diodes extending outwardly from the printed circuit board for projecting light outwardly through the transparent central exterior face of the vehicle and out from the vehicle to increase visibility of the light by other motorists forwardly and rearwardly and laterally of the vehicle to thereby maximize safety; and supplemental electrical components including supplemental wiring coupling the printed circuit boards and their light emitting diodes to the battery, switch and conventional lights whereby when the switch is pivoted downwardly by an operator of the vehicle to energize the conventional lights on the front and rear adjacent to the left side of the vehicle, the light emitting diodes on the left side of the vehicle will also be energized and flash, and whereby when the switch is pivoted upwardly by an operator of the vehicle to energize the conventional lights on the front and rear adjacent to right side of the vehicle, the light emitting diodes on the right side of the vehicle will also be energized and flash, and whereby the light emitting diodes on both sides of the vehicle will flash with the conventional lights on the front and rear adjacent to both sides of the vehicle to function together as emergency flashing lights in response to activation of an emergency switch.

* * * * *